P. B. O'Brien & William E. Sparks' Imp't in FURNITURE CASTER.
Assignor to P. B. O'Brien
PATENTED DEC 10 1867
71904
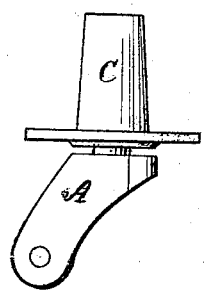
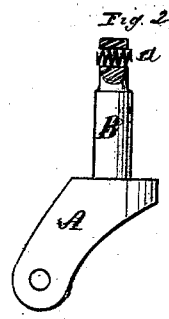
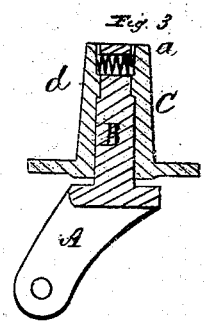
Witnesses
P. B. O'Brien & Wm E. Sparks
Inventor

United States Patent Office.

P. B. O'BRIEN AND WILLIAM E. SPARKS, OF NEW HAVEN, CONNECTICUT, ASSIGNORS TO P. B. O'BRIEN.

Letters Patent No. 71,904, dated December 10, 1867.

IMPROVED CASTER FOR FURNITURE.

*The Schedule referred to in these Letters Patent and making part of the same.*

TO ALL WHOM IT MAY CONCERN:

Be it known that we, P. B. O'BRIEN and WILLIAM E. SPARKS, of New Haven, in the county of New Haven, and State of Connecticut, have invented a new Improvement in Furniture-Casters; and we do hereby declare the following, when taken in connection with the accompanying drawings, and the letters of reference marked thereon, to be a full, clear, and exact description of the same, and which said drawings constitute part of this specification, and represent, in—

Figure 1, a side view of the caster and socket.

Figure 2, a side view of the caster detached from the socket, the upper portion of the spindle in section; and in Figure 3, a section of the caster and socket.

This invention relates to an improvement in casters, such as are attached to the legs of furniture, the object being to make the caster easily detachable from its socket, and yet so as to be held in the socket as not to be accidentally removed therefrom; and the invention consists in the insertion, through the spindle transversely, of a spiral spring, either or both ends of the spring projecting through the spindle, so as to pass over and lock behind a shoulder in the socket when inserted therein.

In order to the clear understanding of our invention, we will proceed to describe the same, as illustrated in the accompanying drawings.

A is the caster, into which the wheel is placed in the usual manner; B, the spindle on the caster; C, the socket; the said socket being formed in accordance with the article of furniture to which it is to be attached. The upper end of the spindle B we prefer to reduce as denoted in fig. 2, then transversely through the reduced portion we pass a spiral spring, $a$, as seen in fig. 2, the said spring projecting through upon each side of the spindle nearly as much as the reduction of the spindle. The socket is bored out to receive the spindle, and so as to form a shoulder, $d$, then above the said shoulder the opening through the socket is enlarged, as seen in fig. 3. The spindle is inserted into the socket, the spring passes over the shoulder $d$, being compressed in so doing, and when so passed over, the reaction of the spring throws out over the shoulder, as seen in fig. 3, and the spring rests on the shoulder, and prevents the accidental removal of the socket; but if it is desired, for any purpose, to remove the caster, it may be pulled from its socket, the spring contracting to pass the shoulder in like manner as when it was inserted. Thus, by this simple arrangement, costing no more than the ordinary riveting of the two parts together, we have produced a detachable caster perfect in its operation.

It will be observed that the spindle is bored through the spring. The same result is attained if but bored partially through, and a shorter spring inserted, to project but upon one side.

Having thus fully described our invention, what we claim as new and useful, and desire to secure by Letters Patent, is—

The arrangement of the spring $a$ in the spindle B, and combined with the socket C, so as to operate in the manner substantially as described.

P. B. O'BRIEN,
WILLIAM E. SPARKS.

Witnesses:
JOHN E. EARLE,
A. J. TIBBITS.